US012675186B2

(12) United States Patent
Yang et al.

(10) Patent No.: US 12,675,186 B2
(45) Date of Patent: Jul. 7, 2026

(54) TOUCH PANEL, DISPLAY DEVICE, AND ELECTRONIC DEVICE

(71) Applicant: Samsung Display Co., Ltd., Yongin-Si (KR)

(72) Inventors: Sung-Jin Yang, Yongin-si (KR); Hyunsik Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/196,753

(22) Filed: May 2, 2025

(65) Prior Publication Data

US 2026/0111081 A1 Apr. 23, 2026

(30) Foreign Application Priority Data

Oct. 21, 2024 (KR) ........................ 10-2024-0144000

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05); *G06F 2203/04107* (2013.01)

(58) Field of Classification Search
CPC . G06F 3/041–04186; G06F 3/044–047; G06F 2203/04107
See application file for complete search history.

(56) References Cited

U.S. PATENT DOCUMENTS

| | | | | |
|---|---|---|---|---|
| 11,861,094 B2 * | 1/2024 | Han | .................... | G06F 3/0443 |
| 2011/0057893 A1 | 3/2011 | Kim et al. | | |
| 2015/0060256 A1 * | 3/2015 | Kim | .................... | G06F 3/0446 |
| | | | | 200/600 |
| 2017/0108971 A1 * | 4/2017 | Yang | .................... | G06F 1/163 |
| 2019/0310731 A1 * | 10/2019 | Rhe | .................... | G06F 3/047 |
| 2020/0159350 A1 * | 5/2020 | Yang | .................... | G06F 3/0448 |
| 2021/0365158 A1 * | 11/2021 | Jeong | .................... | G06F 3/0446 |
| 2023/0315236 A1 * | 10/2023 | Yang | .................... | G06F 3/0448 |
| | | | | 345/174 |
| 2023/0376135 A1 * | 11/2023 | Han | .................... | G06F 3/04164 |

FOREIGN PATENT DOCUMENTS

KR 10-1082293 B1 11/2011

* cited by examiner

*Primary Examiner* — Gene W Lee
(74) *Attorney, Agent, or Firm* — Innovation Counsel LLP

(57) ABSTRACT

A touch panel includes first touch electrodes arranged in a first direction in a sensing area, second touch electrodes arranged in a second direction in the sensing area, a first touch line connected to a first touch electrode arranged at a corner of the sensing area among the first touch electrodes and including a first overlapping portion overlapping the first touch electrode in a plan view, a second touch line connected to a second touch electrode arranged at the corner of the sensing area among the second touch electrodes and including a second overlapping portion overlapping the second touch electrode in the plan view, and a guard line arranged between the first overlapping portion and the second overlapping portion.

20 Claims, 9 Drawing Sheets

10

DA

NDA

PX

F I G .  3
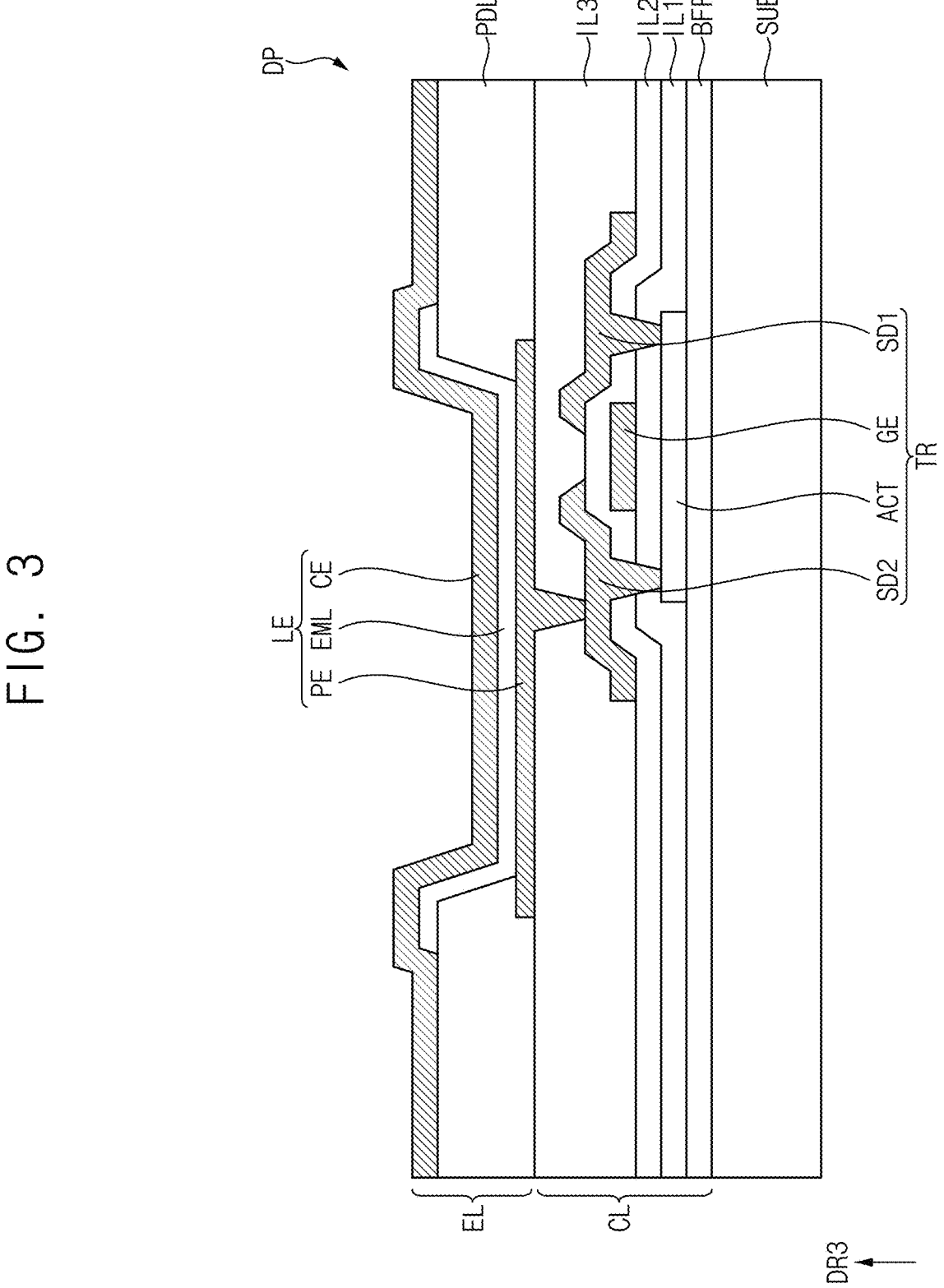

FIG. 7

TOUCH PANEL, DISPLAY DEVICE, AND ELECTRONIC DEVICE

CROSS-REFERENCE TO RELATED APPLICATION(S)

This application claims priority under 35 USC § 119 to Korean Patent Application No. 10-2024-0144000 filed on Oct. 21, 2024, in the Korean Intellectual Property Office (KIPO), the entire disclosure of which is incorporated by reference herein.

BACKGROUND

1. Field

Embodiments relate to a touch panel, a display device including the touch panel, and an electronic device including the display device.

2. Description of the Related Art

Recently, a touch panel that recognizes a touch input has been applied as an input device of a display device, mainly in a smartphone or a tablet PC. The touch panel determines whether a user has entered a touch input and calculates a corresponding position as touch input coordinates.

A corner of a display screen of the display device may have a non-orthogonal shape such as a rounded shape (a corner-rounded shape), and accordingly, a corresponding corner of the touch panel may also have a non-orthogonal shape such as a rounded shape (a corner-rounded shape).

SUMMARY

Embodiments provide a touch panel with improved reliability.

Embodiments provide a display device including the touch panel.

Embodiments provide an electronic device including the display device.

A touch panel according to aspects of the present disclosure includes a plurality of first touch electrodes disposed in a sensing area and arranged in a first direction, a plurality of second touch electrodes disposed in the sensing area and arranged in a second direction intersecting the first direction, a first touch line connected to a first touch electrode disposed at a corner of the sensing area among the plurality of first touch electrodes and including a first overlapping portion at least partially overlapping the first touch electrode in a plan view, a second touch line connected to a second touch electrode disposed at the corner of the sensing area among the plurality of second touch electrodes and including a second overlapping portion at least partially overlapping the second touch electrode in the plan view, and a guard line arranged between the first overlapping portion and the second overlapping portion.

The guard line may include an extension portion extending along a profile of the corner of the sensing area and a protrusion portion protruding from the extension portion toward the first touch electrode and the second touch electrode.

The protrusion portion of the guard line may be arranged between the first overlapping portion and the second overlapping portion.

The first touch line may be connected to the first touch electrode through a first contact hole in the first overlapping portion, and the second touch line may be connected to the second touch electrode through a second contact hole in the second overlapping portion.

The guard line may be spaced apart from each of the first touch electrode and the second touch electrode.

The touch panel may further include a first dummy pattern electrode arranged between the guard line and the first touch line and a second dummy pattern electrode arranged between the guard line and the second touch line.

The first dummy pattern electrode may be arranged between the protrusion portion of the guard line and the first overlapping portion of the first touch line, and the second dummy pattern electrode may be arranged between the protrusion portion of the guard line and the second overlapping portion of the second touch line.

The first dummy pattern electrode may at least partially overlap the first touch electrode in the plan view, and the second dummy pattern electrode may at least partially overlap the second touch electrode in the plan view.

The touch panel may further include a first sub-dummy pattern electrode arranged on the first dummy pattern electrode and at least partially overlapping the first dummy pattern electrode in the plan view, and a second sub-dummy pattern electrode arranged on the second dummy pattern electrode and at least partially overlapping the second dummy pattern electrode in the plan view.

The first sub-dummy pattern electrode and the second sub-dummy pattern electrode may be arranged in a same layer as the first touch electrode and the second touch electrode.

The corner of the sensing area may have a non-orthogonal planar shape.

The corner of the sensing area may have a curvature in the plan view.

The touch panel may further include a dummy electrode arranged between the plurality of first touch electrodes and the plurality of second touch electrodes adjacent to each other.

The dummy electrode may be arranged between the first touch electrode and the second touch electrode at the corner of the sensing area.

The touch panel may further include a touch island electrode arranged in the sensing area and arranged between the plurality of first touch electrodes adjacent to each other, and a connection electrode arranged in the sensing area and connecting the touch island electrode and the plurality of first touch electrodes adjacent to the touch island electrode.

A display device according to aspects of the present disclosure includes a display panel including a plurality of pixels arranged in a display area, and a touch panel arranged on the display panel and including a plurality of first touch electrodes disposed in a sensing area corresponding to the display area and arranged in a first direction, a plurality of second touch electrodes disposed in the sensing area and arranged in a second direction intersecting the first direction, a first touch line connected to a first touch electrode disposed at a corner of the sensing area among the plurality of first touch electrodes and including a first overlapping portion at least partially overlapping the first touch electrode in a plan view, a second touch line connected to a second touch electrode disposed at the corner of the sensing area among the plurality of second touch electrodes and including a second overlapping portion at least partially overlapping the second touch electrode in the plan view, and a guard line arranged between the first overlapping portion and the second overlapping portion.

The guard line may include an extension portion extending along a profile of the corner of the sensing area, and a protrusion portion protruding from the extension portion toward the first touch electrode and the second touch electrode and arranged between the first overlapping portion and the second overlapping portion.

The touch panel may further include a first dummy pattern electrode arranged between the protrusion portion of the guard line and the first overlapping portion of the first touch line, and a second dummy pattern electrode arranged between the protrusion portion of the guard line and the second overlapping portion of the second touch line.

The corner of the sensing area may have a non-orthogonal planar shape.

An electronic device according to aspects of the present disclosure includes a display device and a processor that controls the display device. The display device includes a display panel including a plurality of pixels arranged in a display area, and a touch panel arranged on the display panel and including a plurality of first touch electrodes disposed in a sensing area corresponding to the display area and arranged in a first direction, a plurality of second touch electrodes disposed in the sensing area and arranged in a second direction intersecting the first direction, a first touch line connected to a first touch electrode disposed at a corner of the sensing area among the plurality of first touch electrodes and including a first overlapping portion at least partially overlapping the first touch electrode in a plan view, a second touch line connected to a second touch electrode disposed at the corner of the sensing area among the plurality of second touch electrodes and including a second overlapping portion at least partially overlapping the second touch electrode in the plan view, and a guard line arranged between the first overlapping portion and the second overlapping portion.

In a display device according to embodiments of the present disclosure, the display device may include a touch panel in which at least one of corners has a non-orthogonal planar shape. At the corner, a guard line and a dummy pattern electrode may be arranged between touch lines that are adjacent to each other and are respectively connected to different touch electrodes. Accordingly, parasitic capacitance between the touch lines may be minimized at the corner.

BRIEF DESCRIPTION OF THE DRAWINGS

FIG. 3 is a cross-sectional view illustrating a display panel of the display device of FIG. 2 according to aspects of the present disclosure.

FIG. 7 is an enlarged plan view of area B of FIG. 4 according to aspects of the present disclosure.

DETAILED DESCRIPTION OF THE EMBODIMENTS

Figure 1:
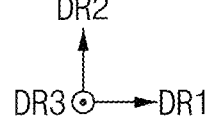
FIG. 1 is a plan view illustrating a display device according to aspects of the present disclosure.

Hereinafter, embodiments of the present disclosure will be described in more detail with reference to the accompanying drawings. The same reference numerals are used for the same components in the drawings, and redundant descriptions of the same components will be omitted.

FIG. 1 is a plan view illustrating a display device according to aspects of the present disclosure.

Referring to FIG. 1, a display device 10 may include a display area DA and a non-Display are NDA.

The display area DA may be an area that displays an image. A plurality of pixels PX may be disposed in the display area DA along a first direction DR1 and a second direction DR2 intersecting the first direction DR1. For example, the second direction DR2 may be perpendicular to the first direction DR1. Each of the pixels PX may include a pixel circuit and a light emitting element and may be configured to emit light. Accordingly, an image may be displayed in the display area DA by selective activation of pixels in the display area with appropriate energy. For example, in the display area DA, an image may be displayed in a third direction DR3 intersecting each of the first direction DR1 and the second direction DR2. For example, the third direction DR3 may be perpendicular to each of the first direction DR1 and the second direction DR2.

Signal lines such as a gate line, a data line, or the like may be further disposed in the display area DA. The signal lines may be connected to each of the pixels PX, respectively. The signal lines may provide a gate signal, a data signal, or the like to each of the pixels PX.

The display area DA may be parallel to a plane defined by the first direction DR1 and the second direction DR2. The display area DA may have a first side extending in a first direction (e.g., the first direction DR1) and a second side extending in a second direction (e.g., the second direction DR2) intersecting the first direction. In an embodiment, a corner in which the first side and the second side meet of the display area DA may be formed with a non-orthogonal shape in a plan view. For example, the corner of the display area DA may have a curvature or may be formed as an acute angle or an obtuse angle that is not a right angle. When the corner of the display area DA has a curvature, the curvature may be constant, or may vary. For example, the display area DA may have a planar shape of a polygon with a rounded corner. For example, the display area DA may have a planar shape of a polygon with an acute or obtuse corner.

Although FIG. 1 illustrates that the display area DA has a rectangular planar shape with rounded corners, the planar shape of the display area DA is not limited to a rectangular shape, and may be a polygonal, circular, or elliptical shape.

The non-display area NDA may be an area that is not configured to display an image. The non-display area NDA may be arranged around the display area DA. For example, the non-display area NDA may surround the display area DA in a plan view. Drivers for displaying an image in the display area DA may be arranged in the non-display area NDA.

The display device 10 may be formed to be flat but is not limited thereto. For example, the display device 10 may include curved portions formed at left and right ends. In this case, the curved portions may have a constant curvature or a varying curvature. In addition, for example, the display device 10 may be flexible and able to be bent, curved, folded, or rolled.

Figure 2:
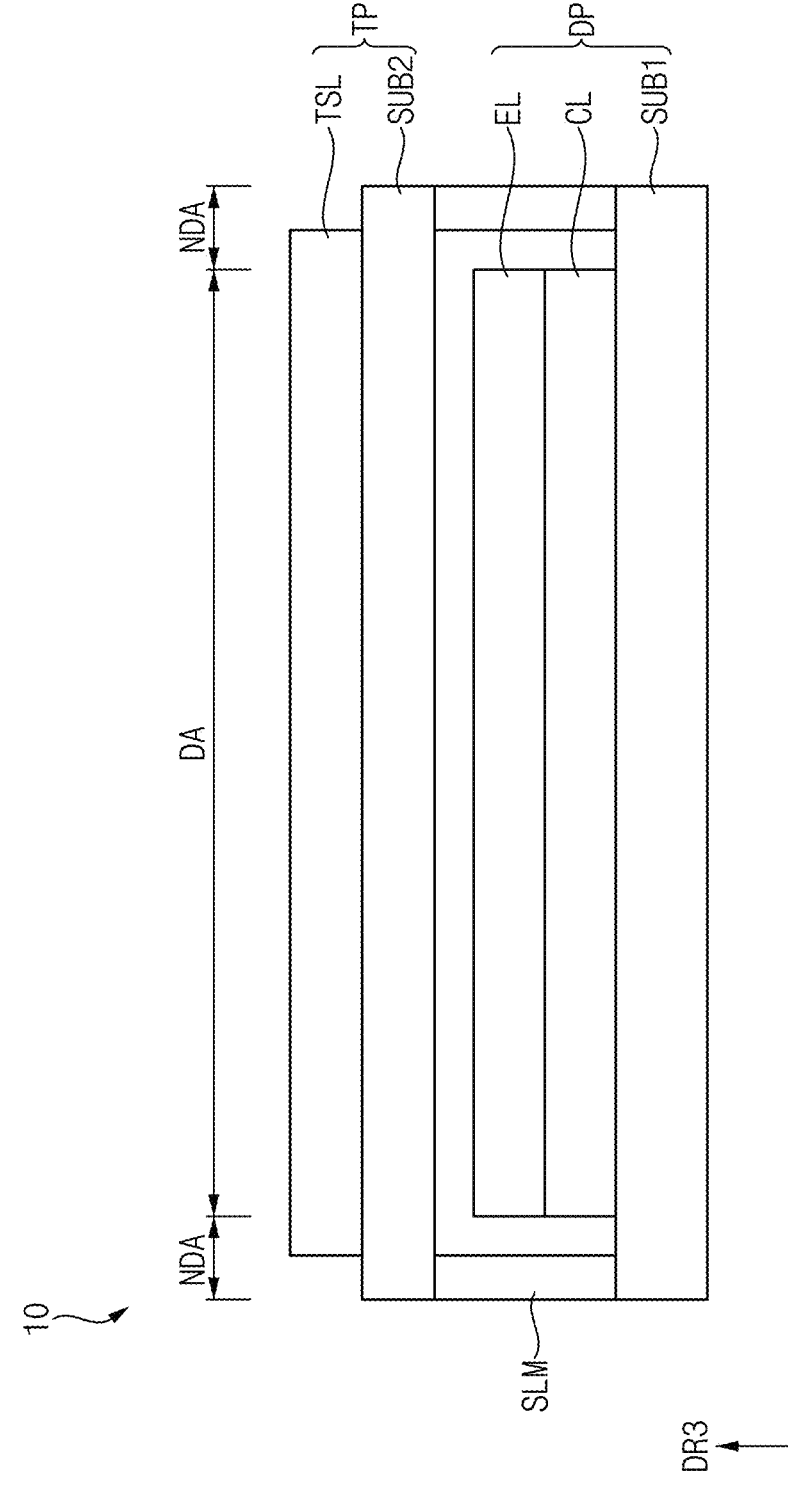
FIG. 2 is a cross-sectional view schematically illustrating the display device of FIG. 1 according to aspects of the present disclosure.

FIG. 2 is a cross-sectional view schematically illustrating the display device of FIG. 1 according to aspects of the present disclosure.

Referring to FIGS. 1 and 2, the display device 10 may include a display panel DP, a sealing member SLM, and a touch panel TP.

The display panel DP may include a first substrate SUB1, a circuit layer CL, and a light emitting element layer EL.

The first substrate SUB1 may include a transparent material or an opaque material. Examples of materials that may be used as the first substrate SUB1 may include glass, quartz, polymer, silicon, or the like. These may be used alone or in combination with each other.

The circuit layer CL may be arranged on the first substrate SUB1. For example, the circuit layer CL may include a transistor, the gate line, the data line, or the like. The circuit layer CL may overlap the display area DA and the non-display area NDA in a plan view.

The light emitting element layer EL may be arranged on the circuit layer CL. The light emitting element layer EL may include a light emitting element that generates light and a pixel defining layer that defines a pixel. The light emitting element of the light emitting element layer EL may overlap the display area DA in a plan view.

The touch panel TP may include a second substrate SUB2 and a touch sensing layer TSL.

The second substrate SUB2 may include a transparent material or an opaque material. Examples of materials that may be used as the second substrate SUB2 may include glass, quartz, polymer, silicon, or the like. These may be used alone or in combination with each other. The second substrate SUB2 may serve as an encapsulation substrate that covers the light emitting element layer EL.

The touch sensing layer TSL may be arranged on the second substrate SUB2. The touch sensing layer TSL may include a plurality of touch electrodes that sense a user's processing in a capacitive manner, a plurality of touch electrode pads, a plurality of touch driving lines and a plurality of touch sensing lines that electrically connect the touch electrode pads and the touch electrodes. For example, the touch sensing layer TSL may sense a user's touch in a self-capacitance method or a mutual capacitance method, but the present disclosure is not limited thereto.

An anti-reflection layer and a cover window may be additionally arranged on the touch sensing layer TSL. In this case, for example, the anti-reflection layer may be arranged on the touch sensing layer TSL, and the cover window may be attached on the anti-reflection layer by a transparent adhesive member.

A sealing member SLM may couple the display panel DP and the touch panel TP. For example, the sealing member SLM may overlap the non-display area NDA in a plan view, and may couple the first substrate SUB1 of the display panel DP and the second substrate SUB2 of the touch panel TP. For example, the sealing member SLM may include a frit adhesive layer, an ultraviolet-curable resin, or a thermosetting resin, but the present disclosure is not limited thereto.

Although FIG. 2 illustrates that a space is empty between the light emitting element layer EL and the second substrate SUB2, the present disclosure is not limited thereto. For example, a filling film (not shown) may be arranged between the light emitting element layer EL and the second substrate SUB2. The filling film may include an epoxy filling film or a silicon filling film, but the present disclosure is not limited thereto.

FIG. 3 is a cross-sectional view illustrating a display panel of the display device of FIG. 2 according to aspects of the present disclosure. For example, FIG. 3 may be a cross-sectional view illustrating a portion of the display area DA of FIG. 2.

Referring to FIGS. 2 and 3, the display panel DP may include the first substrate SUB1, the circuit layer CL arranged on the first substrate SUB1, and the light emitting element layer EL arranged on the circuit layer CL. Here, the circuit layer CL may include a buffer layer BFR, a transistor TR, a first insulating layer IL1, a second insulating layer IL2, and a third insulating layer IL3, and the light emitting element layer EL may include a light emitting element LE and a pixel defining layer PDL.

The buffer layer BFR may be arranged on the first substrate SUB1. The buffer layer BFR may prevent metal atoms, impurities, or the like from diffusing into the transistor TR. The buffer layer BFR may include an inorganic material such as silicon oxide ($SiO_x$), silicon nitride ($SiN_x$), silicon oxynitride ($SiO_xN_y$), or the like. These may be used alone or in combination with each other.

The active region ACT may be arranged on the buffer layer BFR. The active region ACT may include a source area, a drain area, and a channel area between the source area and the drain area. The active region ACT may include a silicon semiconductor material, an oxide semiconductor material, or the like. Examples of the silicon semiconductor material may include amorphous silicon, polycrystalline silicon, or the like. Examples of the oxide semiconductor material may include indium gallium zinc oxide (IGZO), indium tin zinc oxide (ITZO), or the like. These may be used alone or in combination with each other.

The first insulating layer IL1 may be arranged on the active region ACT and may cover at least a portion of the active region ACT. The first insulating layer IL1 may include an inorganic material such as silicon oxide, silicon nitride, silicon oxynitride, or the like. These may be used alone or in combination with each other.

The gate electrode GE may be arranged on the first insulating layer IL1. The gate electrode GE may overlap the channel area of the active region ACT in a plan view. The gate electrode GE may include a metal, an alloy, a conductive metal oxide, a conductive metal nitride, a transparent conductive material, or the like. These may be used alone or in combination with each other.

The second insulating layer IL2 may be arranged on the gate electrode GE, and may cover the gate electrode GE. The second insulating layer IL2 may include an inorganic material such as silicon oxide, silicon nitride, silicon oxynitride, or the like. These may be used alone or in combination with each other.

The first electrode SD1 and the second electrode SD2 may be arranged on the second insulation layer IL2. The first electrode SD1 may be connected to the source area of the active region ACT through a first contact hole penetrating a lower insulating layer (e.g., the first insulating layer IL1 and the second insulating layer IL2). In addition, the second electrode SD2 may be connected to the drain area of the active region ACT through a second contact hole penetrating a lower insulating layer (e.g., the first insulating layer IL1 and the second insulating layer IL2). The first electrode SD1 and the second electrode SD2 may include a metal, an alloy, a conductive metal oxide, a conductive metal nitride, a transparent conductive material, or the like. These may be used alone or in combination with each other.

Accordingly, the transistor TR including the active region ACT, the gate electrode GE, the first electrode SD1, and the second electrode SD2 may be arranged in the display area DA on the first substrate SUB1. The transistor TR may be included in the pixel circuit.

The third insulating layer IL3 may be arranged on the first electrode SD1 and the second electrode SD2, and may cover the first electrode SD1 and the second electrode SD2. The third insulating layer IL3 may include an organic material such as phenol resin, acrylic resin, polyimide resin, poly-amide resin, siloxane resin, epoxy resin, or the like. These may be used alone or in combination with each other.

The pixel electrode PE may be arranged on the third insulating layer IL3. The pixel electrode PE may be elec-trically connected to the transistor TR. For example, the pixel electrode PE may be connected to the second electrode SD2 (or the first electrode SD1) through a contact hole penetrating through a lower insulating layer (e.g., the third insulating layer IL3). The pixel electrode PE may include a metal, an alloy, a conductive metal oxide, a conductive metal nitride, a transparent conductive material, or the like. These may be used alone or in combination with each other.

The pixel defining layer PDL may be arranged on the third insulating layer IL3 and the pixel electrode PE. The pixel defining layer PDL may cover an edge of the pixel electrode PE and may define an opening exposing at least a portion of an upper surface of the pixel electrode PE. The pixel defining layer PDL may include an organic material such as a polyimide resin, an epoxy resin, a siloxane resin, or the like. These may be used alone or in combination with each other.

The light emitting layer EML may be at least partially disposed on the pixel electrode PE. The light emitting layer EML may be arranged on the upper surface of the pixel electrode PE exposed by the pixel defining layer PDL. The light emitting layer EML may include a material that emits light of a selected color when excited with a suitable energy. For example, the light emitting layer EML may include a material that emits red light, green light, or blue light, but the present disclosure is not limited thereto.

The common electrode CE may be disposed on the pixel defining layer PDL and the light emitting layer EML. The common electrode CE may include a metal, an alloy, a conductive metal oxide, a conductive metal nitride, a trans-parent conductive material, or the like. These may be used alone or in combination with each other.

Accordingly, the light emitting element LE includes the pixel electrode PE, the light emitting layer EML, and the common electrode CE may be located in the display area DA on the first substrate SUB1. The light emitting element LE may be electrically connected to the transistor TR. The light emitting element LE may generate light when provided a driving current from the transistor TR. The transistor TR and the light emitting element LE may correspond to a pixel (e.g., each of the pixels PX of FIG. 1).

Figure 4:
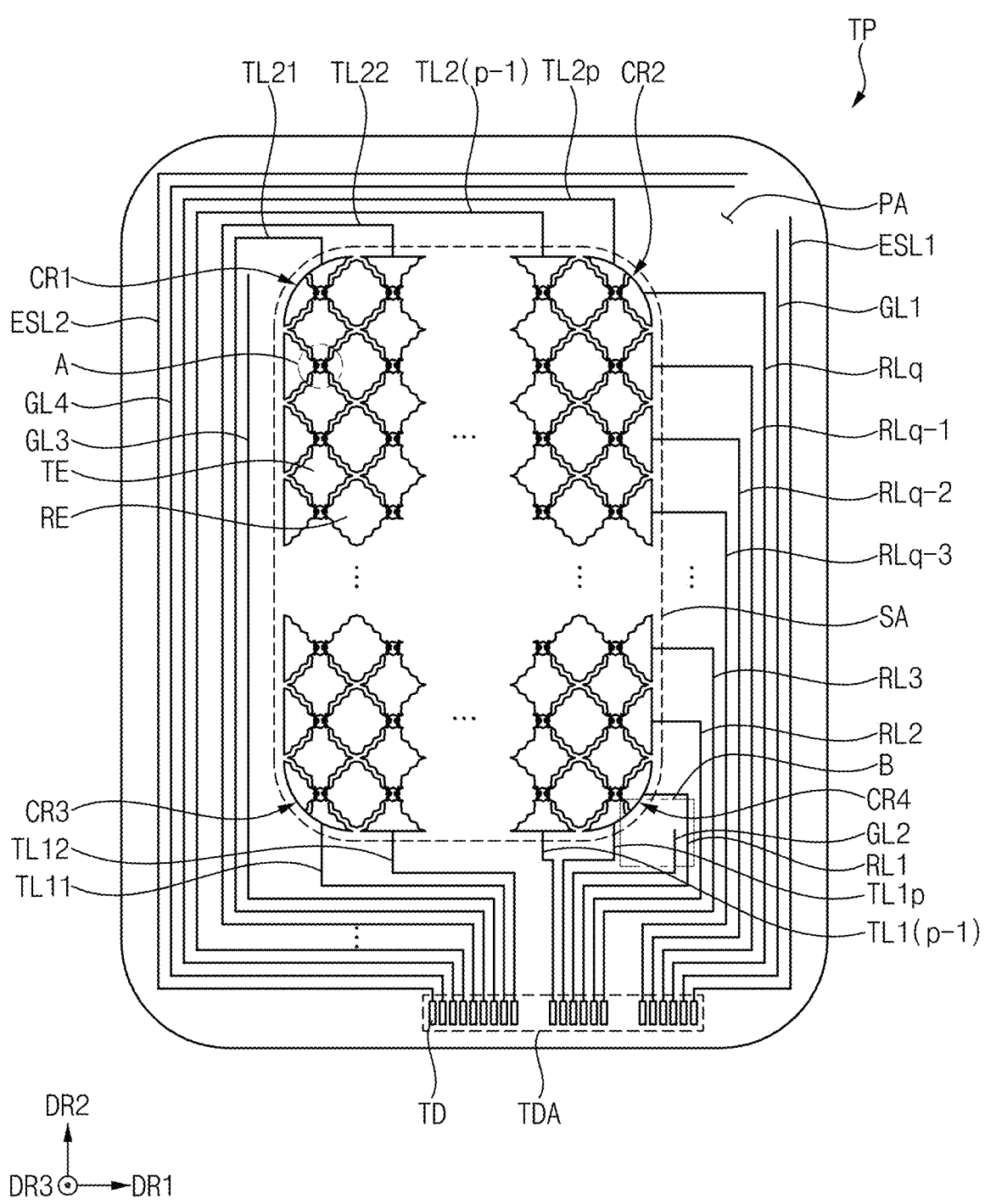
FIG. 4 is a plan view illustrating a touch panel of the display device of FIG. 2 according to aspects of the present disclosure.
Figure 5:
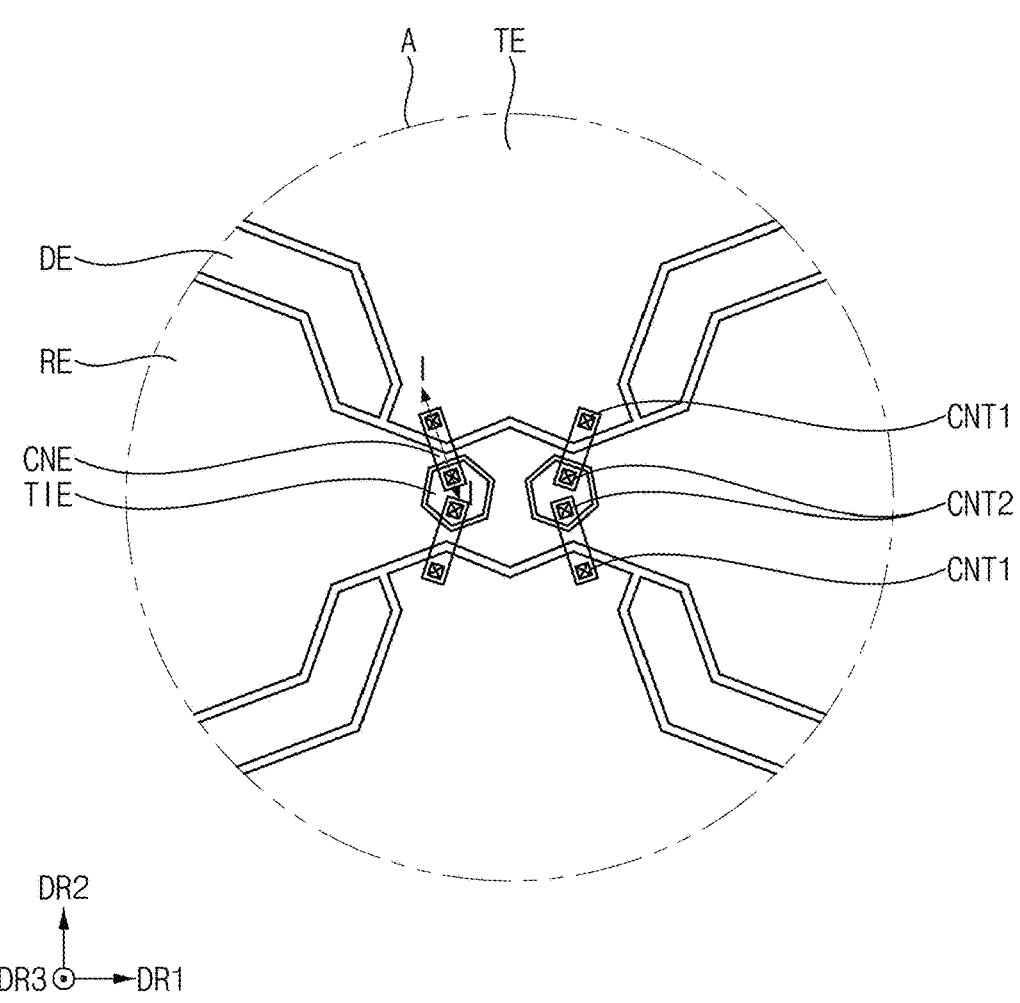
FIG. 5 is an enlarged plan view of area A of FIG. 4 according to aspects of the present disclosure

FIG. 4 is a plan view illustrating a touch panel of the display device of FIG. 2. FIG. 5 is an enlarged plan view of area A of FIG. 4. For example, FIG. 5 may be a plan view illustrating a portion of a sensing area SA of the touch panel TP.

Referring to FIGS. 2, 4, and 5, the touch panel TP may include the sensing area SA that senses a user's touch and a peripheral area PA that does not sense the user's touch.

The peripheral area PA may be located around the sensing area SA. For example, the peripheral area PA may surround the sensing area SA in a plan view. The peripheral area PA may have a shape corresponding to the sensing area SA.

The sensing area SA may correspond to the display area DA of FIGS. 1 and 2, and the peripheral area PA may correspond to the non-display area NDA of FIGS. 1 and 2. In a plan view, the sensing area SA may overlap the display area DA, and the peripheral area PA may overlap the non-display area NDA. However, the present disclosure is not limited thereto, and the sensing area SA may further at least partially overlap the non-display area NDA in a plan view.

The touch panel TP may include first touch electrodes TE, second touch electrodes RE, dummy electrodes DE, first touch lines TL11 to TL1$p$ (where p is a natural number of 2 or more), second touch lines TL21 to TL2$p$, third touch lines RL1 to RL$q$ (where q is a natural number of 2 or more), ground lines ESL1 and ESL2, guard lines GL1, GL2, GL3 and GL4, and touch electrode pads TD. In addition, the touch panel TP may further include connection electrodes CNE and first touch island electrodes TIE connecting the first touch electrodes TE adjacent to each other.

The first touch electrodes TE, the second touch electrodes RE, the dummy electrodes DE, the connection electrodes CNE, and the first touch island electrodes TIE may be arranged in the sensing area SA. That is, the sensing area SA may be defined as an area in which the first touch electrodes TE, the second touch electrodes RE, the dummy electrodes DE, the connection electrodes CNE, and the first touch island electrodes TIE are arranged.

In an embodiment, at least one of corners of the sensing area SA (or the touch panel TP) may have a non-orthogonal planar shape. For example, the sensing area SA may include first, second, third, and fourth corners CR1, CR2, CR3, and CR4. The first corner CR1 may be defined as an upper left corner of the sensing area SA, the second corner CR2 may be defined as an upper right corner of the sensing area SA, the third corner CR3 may be defined as a lower left corner of the sensing area SA, and the fourth corner CR4 may be defined as lower right corner of the sensing area SA.

For example, each of the first, second, third, and fourth corners CR1, CR2, CR3, and CR4 may have a curved shape having a selected curvature in a plan view. The curvature may be constant or may vary. In this case, the curvatures of the first, second, third, and fourth corners CR1, CR2, CR3, and CR4 may not be limited in their degree. For example, the first, second, third, and fourth corners CR1, CR2, CR3, and CR4 may have the same curvature or different curva-tures from each other, or at least one of the first, second, third, and fourth corners CR1, CR2, CR3, and CR4 may have a different curvature.

In addition, for example, each of the first, second, third, and fourth corners CR1, CR2, CR3, and CR4 may have an acute angle or an obtuse angle in a plan view. In this case, the angles of the first, second, third, and fourth corners CR1, CR2, CR3, and CR4 in a plan view may not be limited. For example, the first, second, third, and fourth corners CR1, CR2, CR3, and CR4 may have the same angle or different angles from each other, or at least one of the first, second, third, and fourth corners CR1, CR2, CR3, and CR4 may have a different angle.

The first touch electrodes TE and the second touch electrodes RE may have a shape corresponding to a planar shape of the sensing area SA. That is, first and second touch electrodes TE and RE defining the first, second, third, and fourth corners CR1, CR2, CR3, and CR4 among the first and second touch electrodes TE and RE may have a non-orthogonal planar shape. For example, the first and second touch electrodes TE and RE defining the first, second, third, and fourth corners CR1, CR2, CR3, and CR4 may have a curved shape having a selected curvature in a plan view. In addition, for example, the first and second touch electrodes TE and RE defining the first, second, third, and fourth corners CR1, CR2, CR3, and CR4 may have an acute angle or an obtuse angle in a plan view.

The first touch electrodes TE and the second touch electrodes RE may be arranged to be spaced apart from each other. For example, the first touch electrodes TE may be arranged in the second direction DR2 in a plurality of columns, and the second touch electrodes RE may be arranged in the first direction DR1 in a plurality of rows. That is, the first touch electrodes TE may extend in the second direction DR2 and may be distributed along the first direction DR1. The second touch electrodes RE may extend in the first direction DR1 and may be distributed along the second direction DR2. Here, the term "extend" may mean not only extending in a direction in which a plurality of touch electrodes physically connected to each other, but also extending in a direction in which a plurality of touch electrodes that are not physically connected to each other but are electrically connected. For example, the first touch electrodes TE arranged in the second direction DR2 may not be physically connected to each other, and the second touch electrodes RE arranged in the first direction DR1 may be physically connected to each other.

In each of the plurality of columns, the first touch electrodes TE aligned in the second direction DR2 may be electrically connected, and in each of the plurality of rows, the second touch electrodes RE aligned in the first direction DR1 may be electrically connected. The first touch electrodes TE and the second touch electrodes RE may be electrically insulated from each other.

The first touch electrodes TE may be spaced apart from each other and may be electrically connected to each other along the second direction DR2. At least one first touch island electrode TIE may be arranged between the first touch electrodes TE adjacent to each other in the second direction DR2.

The first touch electrodes TE and the first touch island electrodes TIE may be spaced apart from each other. For example, the first touch electrodes TE and the first touch island electrodes TIE may be alternately arranged along the second direction DR2. The first touch electrodes TE and the first touch island electrodes TIE adjacent to each other in the second direction DR2 may be connected through the connection electrodes CNE. Each of the connection electrodes CNE may be connected to the first touch electrodes TE through a first contact hole CNT1 and may be connected to the first touch island electrodes TIE through a second contact hole CNT2. That is, in order to prevent the first touch electrodes TE from being short-circuited with each other, the connection electrodes CNE may electrically connect the first touch electrodes TE and the first touch island electrodes TIE, respectively.

For example, two first touch island electrodes TIE and four connection electrodes CNE may be arranged between the first touch electrodes TE adjacent to each other in the second direction DR2. Even if any one of the four connection electrodes CNE is disconnected, the first touch electrodes TE adjacent to each other may be connected to each other. However, the present disclosure is not limited thereto, and the number of the first touch island electrodes TIE and the connection electrodes CNE arranged between the first touch electrodes TE may be varied.

In this case, the first and second touch electrodes TE and RE and the first touch island electrodes TIE may be arranged in one layer, and the connection electrodes CNE may be arranged in a different layer from the first and second touch electrodes TE and RE and the first touch island electrodes TIE.

The first touch electrodes TE and the second touch electrodes RE disposed in the sensing area SA may generally have a rhombus planar shape or a triangular planar shape. For example, the first touch electrodes TE and the second touch electrodes RE arranged at an edge of the sensing area SA (e.g., the first touch electrodes TE and the second touch electrodes RE arranged at the edge other than the first, second, third, and fourth corners CR1, CR2, CR3, and CR4 of the sensing area SA) may each have a triangular planar shape, and the other first touch electrodes TE and the second touch electrodes RE (e.g., the first touch electrodes TE and the second touch electrodes RE arranged at a central portion of the sensing area SA) may each have a rhombus planar shape.

In an embodiment, the first touch electrodes TE and the second touch electrodes RE arranged at the first, second, third, and fourth corners CR1, CR2, CR3, and CR4 of the sensing area SA may each have an irregular planar shape. The first and second touch electrodes TE and RE arranged at the first, second, third, and fourth corners CR1, CR2, CR3, and CR4 may have an irregular planar shape different from the above-described rhombus planar shape or triangle planar shape along a profile of the first, second, third, and fourth corners CR1, CR2, CR3, and CR4 (i.e., a non-orthogonal line, such as a curved line having a curvature or a line forming an acute or obtuse angle). For example, the first and second touch electrodes TE and RE arranged at the first, second, third, and fourth corners CR1, CR2, CR3, and CR4 may each have a shape in which at least one vertex is cut off from the above-described triangle planar shape by partially reducing an area along the profile of the first, second, third, and fourth corners CR1, CR2, CR3, and CR4. In addition, the first and second touch electrodes TE and RE may have convex sides in a plan view to prevent the Moiré phenomenon.

The dummy electrodes DE may be arranged between the first and second touch electrodes TE and RE. The dummy electrode may not be present between the first and second touch electrodes TE and RE in an area in which the first touch electrodes TE and the first touch island electrodes TIE are connected to each other by the connection electrodes CNE in a plan view. In an area in which the connection electrodes CNE and the first touch island electrodes TIE are not arranged, the first and second touch electrodes TE and RE may be spaced apart from each other by the dummy electrodes DE.

The first touch electrodes TE, the second touch electrodes RE, the first touch island electrodes TIE, and the dummy electrodes DE may be physically separated from each other, and a distance may be defined therebetween. For example, the first touch electrodes TE, the second touch electrodes RE, the first touch island electrodes TIE, and the dummy electrodes DE may be spaced apart from each other by a distance in a range of several micrometers ($\mu$m).

The first and second touch electrodes TE and RE, the first touch island electrodes TIE, and the dummy electrodes DE may include the same material and may be arranged in the same layer. The first and second touch electrodes TE and RE, the first touch island electrodes TIE, and the dummy electrodes DE may include a metal, an alloy, a conductive metal oxide, a conductive metal nitride, a transparent conductive material, or the like. For example, the first and second touch electrodes TE and RE, the first touch island electrodes TIE, and the dummy electrodes DE may include indium tin oxide (ITO), but the present disclosure is not limited thereto.

The first touch lines TL11 to TL1$p$, the second touch lines TL21 to TL2$p$, the third touch lines RL1 to RLq, the guard lines GL1, GL2, GL3, and GL4, the ground lines ESL1 and ESL2, and the touch electrode pads TD may be arranged in the peripheral area PA.

The touch electrode pads TD may be arranged on one side of the touch panel TP and may define a touch pad area TDA. The touch pad area TDA may be defined in the peripheral area PA, and the touch electrode pads TD may be repeatedly arranged in the first direction DR1 in the touch pad area TDA.

First ends of the first touch lines TL11 to TL1$p$ may be connected to the first touch electrodes TE arranged on a first side (e.g., a side adjacent to the touch pad area TDA) of the sensing area SA, respectively, and second ends of the first touch lines TL11 to TL1$p$ may be connected to the touch electrode pads TD, respectively. That is, the first touch lines TL11 to TL1$p$ may electrically connect the first touch electrodes TE arranged on the first side of the sensing area SA and the touch electrode pads TD in the touch pad area TDA.

For example, as illustrated in FIG. 4, a first, first touch line TL11 may be electrically connected to the first touch electrodes TE arranged in a first column of the sensing area SA, and a second first touch line TL12 may be electrically connected to the first touch electrodes TE arranged in a second column of the sensing area SA. In addition, a (p−1)-th first touch line TL1($p$−1) may be electrically connected to the first touch electrodes TE arranged in a (p−1)-th column of the sensing area SA, and a p-th first touch line TL1$p$ may be electrically connected to the first touch electrodes TE arranged in a p-th column of the sensing area SA. In this case, the first to p-th columns of the sensing area SA may be arranged along the first direction DR1. That is, by way of example and not by way of limitation, the first column of the sensing area SA may be a column arranged at a leftmost side of the sensing area SA, and the p-th column of the sensing area SA may be a column arranged at a rightmost side of the sensing area SA.

First ends of the second touch lines TL21 to TL2$p$ may be connected to the first touch electrodes TE arranged on a second side (e.g., a side facing the first side and spaced apart from the touch pad area TDA) of the sensing area SA, respectively, and second ends of the second touch lines TL21 to TL2$p$ may be connected to the touch electrode pads TD, respectively. That is, the second touch lines TL21 to TL2$p$ may electrically connect the first touch electrodes TE arranged on the second side of the sensing area SA and the touch electrode pads TD in the touch pad area TDA.

For example, as illustrated in FIG. 4, a first second touch line TL21 may be electrically connected to the first touch electrodes TE arranged in the first column of the sensing area SA, and a second, second touch line TL22 may be electrically connected to the first touch electrodes TE arranged in the second column of the sensing area SA. In addition, a (p−1)-th second touch line TL2($p$−1) may be electrically connected to the first touch electrodes TE arranged in the (p−1)-th column of the sensing area SA, and a p-th second touch line TL2$p$ may be electrically connected to the first touch electrodes TE arranged in the p-th column of the sensing area SA.

First ends of the third touch lines RL1 to RLq may be connected to the second touch electrodes RE arranged on a third side (e.g., a side intersecting each of the first side and the second side) of the sensing area SA, and second ends of the third touch lines RL1 to RLq may be connected to the touch electrode pads TD, respectively. That is, the third touch lines RL1 to RLq may electrically connect the second touch electrodes RE arranged on the third side of the sensing area SA and the touch electrode pads TD in the touch pad area TDA.

For example, as illustrated in FIG. 4, a first third touch line RL1 may be electrically connected to the second touch electrodes RE arranged in a first row of the sensing area SA, and a second third touch line RL2 may be electrically connected to the second touch electrodes RE arranged in a second row of the sensing area SA. In addition, a (q−1)-th third touch line RLq−1 may be electrically connected to the second touch electrodes RE arranged in a (q−1)-th row of the sensing area SA, and a q-th third touch line RLq may be electrically connected to the second touch electrodes RE arranged in a q-th row of the sensing area SA. In this case, the first to q-th rows of the sensing area SA may be arranged along the second direction DR2. That is, for example and without limitation, the first row of the sensing area SA may be a row arranged at a lowest side of the sensing area SA, and the q-th row of the sensing area SA may be a row arranged at a highest side of the sensing area SA.

The first touch electrodes TE and the second touch electrodes RE may be driven by a mutual capacitance method or a self-capacitance method.

For example and without limitation, when the first touch electrodes TE and the second touch electrodes RE are driven by a mutual capacitance method, touch driving signals are supplied to the first touch electrodes TE through the first touch lines TL11 to TL1$p$ and the second touch lines TL21 to TL2$p$ to charge mutual capacitances formed in intersection areas of the first touch electrodes TE and the second touch electrodes RE. Thereafter, charge changes of the mutual capacitances are measured through the second touch electrodes RE, and whether a touch input is made is determined based on the charge changes of the mutual capacitances.

In another non-limiting example, when the first touch electrodes TE and the second touch electrodes RE are driven by a self-capacitance method, touch driving signals are supplied to both the first touch electrodes TE and the second touch electrodes RE through the first touch lines TL11 to TL1$p$, the second touch lines TL21 to TL2$p$, and the third touch lines RL1 to RLq to charge self-capacitances of the first touch electrodes TE and the second touch electrodes RE. Thereafter, charge changes of the self-capacitances are measured through the first touch lines TL11 to TL1$p$, the second touch lines TL21 to TL2$p$, and the third touch lines RL1 to RLq, and whether a touch input is made is determined based on the charge changes of the self-capacitances.

Hereinafter, for convenience of description, the generation of driving signals will be described mainly in the mutual capacitance method in which touch driving signals are applied to the first touch electrodes TE through the first touch lines TL11 to TL1$p$ and the second touch lines TL21 to TL2$p$, and charge changes of mutual capacitances are measured through the third touch lines RL1 to RLq connected to the second touch electrodes RE. In this case, the first touch electrodes TE may function as touch driving electrodes, the second touch electrodes RE may function as touch sensing electrodes, the first and second touch lines TL11 to TL1$p$ and TL21 to TL2$p$ may function as touch driving lines, and the third touch lines RL1 to RLq may function as touch sensing lines.

The ground lines ESL1 and ESL2 may be arranged at an outermost portion of the touch panel TP. The ground lines ESL1 and ESL2 may include a first ground line ESL1 and a second ground line ESL2. For example, the first ground line ESL1 may be arranged at an outermost portion on a right side of the touch panel TP, and the second ground line ESL2 may be arranged at an outermost portion on a lower side, a left side, and an upper side of the touch panel TP. One ends of the first and second ground lines ESL1 and ESL2 may be connected to the touch electrode pads TD, respectively. A ground voltage may be applied to the first and second ground lines ESL1 and ESL2. Accordingly, when static electricity is applied from outside, static electricity may be discharged to the first and second ground lines ESL1 and ESL2. That is, the ground lines ESL1 and ESL2 may alleviate an electrostatic impact that may be applied from the outside to the first and second touch electrodes TE and RE and the first, second, and third touch lines TL11 to TL1$p$, TL21 to TL2$p$, and RL1 to RLq.

The guard lines GL1, GL2, GL3, and GL4 may prevent signal interference that may occur between adjacent lines. The guard lines GL1, GL2, GL3, and GL4 may include a first guard line GL1, a second guard line GL2, a third guard line GL3, and a fourth guard line GL4.

The first guard line GL1 may be arranged on the touch panel next to an outermost side of the third touch lines RL1 to RLq. For example and without limitation, as shown in FIG. 4, the q-th, third touch line RLq is arranged at an outermost side among the third touch lines RL1 to RLq as such the first guard line GL1 may be arranged between the q-th third touch line RLq and the first ground line ESL1. The first guard line GL1 may prevent signal interference between the third touch lines RL1 to RLq and the first ground line ESL1. For example, the first guard line GL1 may serve to minimize an influence of the q-th third touch line RLq by a voltage change of the first ground line ESL1.

The second guard line GL2 may be arranged between the third touch lines RL1 to RLq and the first touch lines TL11 to TL1$p$. For example, the second guard line GL2 may be arranged between the first, third touch line RL1 arranged on an innermost side among the third touch lines RL1 to RLq and the p-th, first touch line TL1$p$ arranged closest to the first third touch line RL1$p$ among the first touch lines TL11 to TL1$p$. The second guard line GL2 may prevent signal interference between the first touch lines TL11 to TL1$p$ and the third touch lines RL1 to RLq. For example, the second guard line GL2 may serve to minimize the influence of the first third touch line RL1 and the p-th first touch line TL1$p$ on each other.

The third guard line GL3 may be arranged between the first touch lines TL11 to TL1$p$ and the second touch lines TL21 to TL2$p$. For example, the third guard line GL3 may be arranged between the first, second touch line TL21 arranged on an innermost side among the second touch lines TL21 to TL2$p$ and the first, first touch line TL11 arranged closest to the first, second touch line TL21 among the first touch lines TL11 to TL1$p$. The third guard line GL3 may prevent signal interference between the first touch lines TL11 to TL1$p$ and the second touch lines TL21 to TL2$p$. For example, the third guard line GL3 may serve to minimize the influence of the first, first touch line TL11 and the first, second touch line TL21 on each other.

The fourth guard line GL4 may be arranged on the touch panel next to an outermost of the second touch lines TL21 to TL2$p$. For example, the fourth guard line GL4 may be arranged between the p-th, second touch line TL2$p$ arranged at an outermost side among the second touch lines TL21 to TL2$p$ and the second ground line ESL2. The fourth guard line GL4 may prevent signal interference between the second touch lines TL21 to TL2$p$ and the second ground line ESL2. For example, the fourth guard line GL4 may serve to minimize an influence of the p-th, second touch line TL2$p$ by a voltage change of the second ground line ESL2.

One end of each of the first, second, third, and fourth guard lines GL1, GL2, GL3, and GL4 may be connected to touch electrode pads TD, respectively, and a voltage may be applied to each of the first, second, third, and fourth guard lines GL1, GL2, GL3, and GL4. For example, when the first touch electrodes TE and the second touch electrodes RE are driven by a mutual capacitance method, a ground voltage may be applied to the first, second, third, and fourth guard lines GL1, GL2, GL3, and GL4.

The touch lines TL11 to TL1$p$, TL21 to TL2$p$, and RL1 to RLq, the ground lines ESL1 and ESL2, and the guard lines GL1, GL2, GL3, and GL4 may include a metal, an alloy, a conductive metal oxide, a conductive metal nitride, a transparent conductive material, or the like. Each of the touch lines TL11 to TL1$p$, TL21 to TL2$p$, and RL1 to RLq, the ground lines ESL1 and ESL2, and the guard lines GL1, GL2, GL3, and GL4 may have a single-layer structure or a multi-layer structure.

Figure 6:
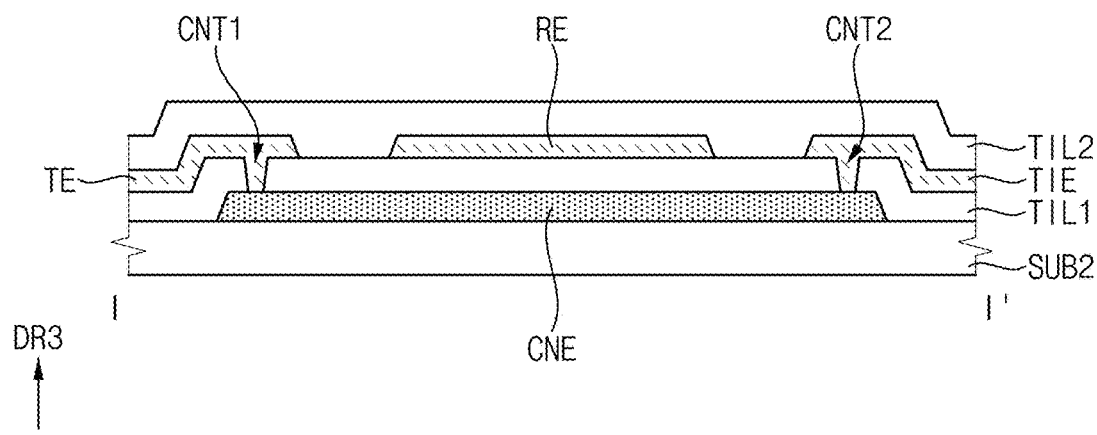
FIG. 6 is a cross-sectional view taken along line I-I' of FIG. 5 according to aspects of the present disclosure.

FIG. 6 is a cross-sectional view taken along line I-I' of FIG. 5. For example, FIG. 6 may be a cross-sectional view illustrating a connection relationship between the first touch electrodes TE, the first touch island electrodes TIE, and the connection electrodes CNE.

Referring to FIGS. 4, 5, and 6, the touch panel TP may include the second substrate SUB2, the connection electrodes CNE, a first touch insulating layer TIL1, the first and second touch electrodes TE and RE, the first touch island electrodes TIE, and a second touch insulating layer TIL2.

The connection electrodes CNE may be arranged on the second substrate SUB2. The connection electrodes CNE may include a metal, an alloy, a conductive metal oxide, a conductive metal nitride, a transparent conductive material, or the like.

The first touch insulating layer TIL1 may be arranged on the connection electrodes CNE and may cover the connection electrodes CNE. The first touch insulating layer TIL1 may include silicon oxide, silicon nitride, silicon oxynitride, or the like.

The first and second touch electrodes TE and RE and the first touch island electrodes TIE may be arranged on the first touch insulating layer TIL1. The first touch electrodes TE may be connected to the connection electrodes CNE through the first contact hole CNT1 penetrating a lower insulating layer (e.g., the first touch insulating layer TIL1). The first touch island electrodes TIE may be connected to the connection electrodes CNE through the second contact hole CNT2 penetrating a lower insulating layer (e.g., the first touch insulating layer TIL1). Since the first touch electrodes TE and the first touch island electrodes TIE may be electrically connected to each other through the connection electrodes CNE, the first touch electrodes TE may be electrically connected to each other.

The second touch insulating layer TIL2 may be arranged on the first and second touch electrodes TE and RE and the first touch island electrodes TIE and may cover the first and second touch electrodes TE and RE and the first touch island electrodes TIE. The second touch insulating layer TIL2 may include silicon oxide, silicon nitride, silicon oxynitride, or the like.

Figure 7:
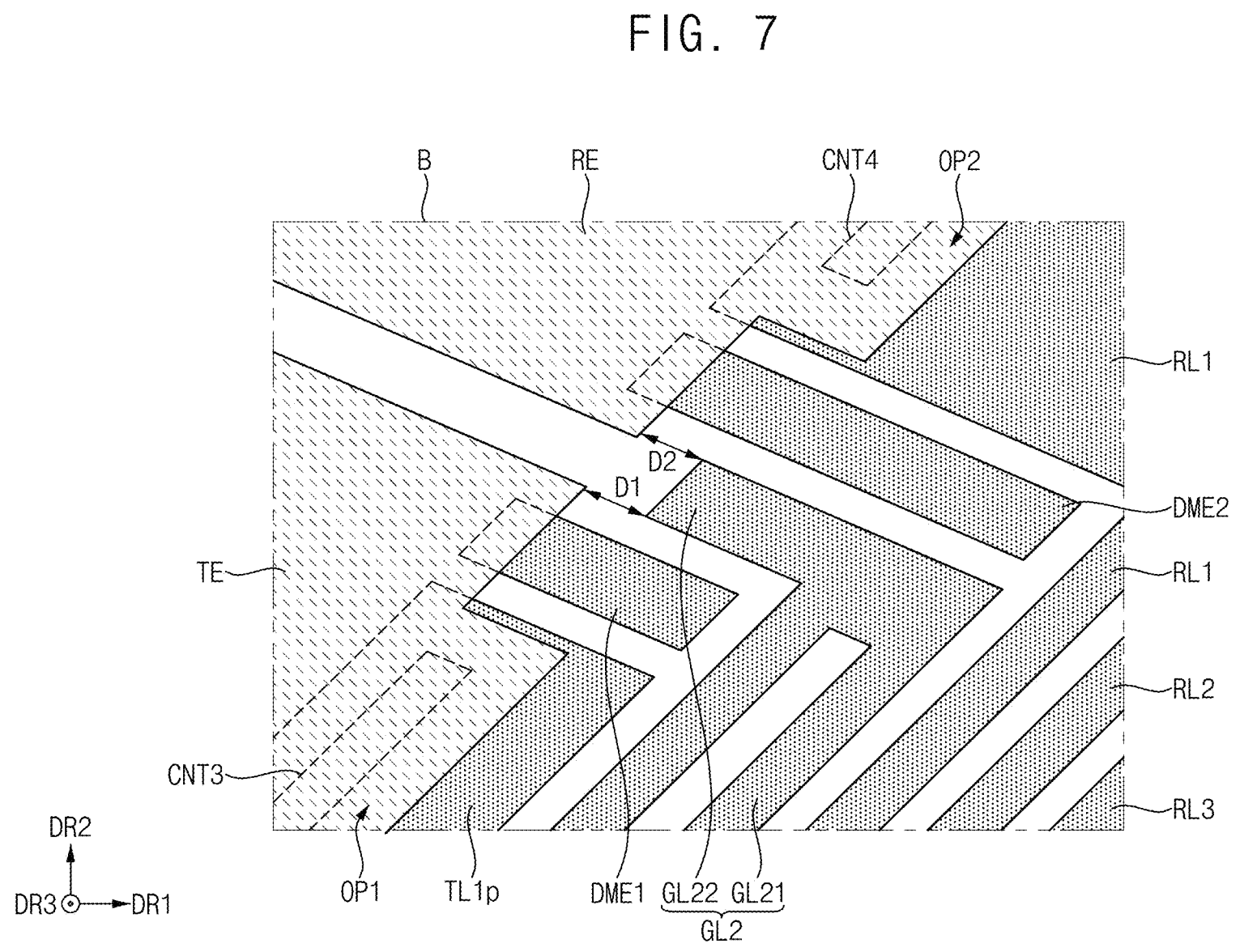

FIG. 7 is an enlarged plan view of area B of FIG. 4. For example, FIG. 7 may be a plan view illustrating a portion of the sensing area SA and the peripheral area PA of the touch panel TP. For example, FIG. 7 may be a plan view illustrating an adjacent (or peripheral) area of the fourth corner CR4.

In FIG. 7, the touch electrodes TE and RE, the touch lines TL1p, RL1, RL2 and RL3, the guard line GL2, and dummy pattern electrodes DME1 and DME2 adjacent to the fourth corner CR4 are mainly described, but the following description may be equally applied to the first, second, and third corners CR1, CR2, and CR3.

Referring to FIGS. 4 and 7, the first and second touch electrodes TE and RE, the first and third touch lines TL1p, RL1, RL2, and RL3, the second guard line GL2, a first dummy pattern electrode DME1, and a second dummy pattern electrode DME2 may be arranged in the peripheral area of the fourth corner CR4 of the touch panel TP.

The first and second touch electrodes TE and RE arranged at the fourth corner CR4 may be spaced apart from each other and may each have an irregular planar shape. The first touch electrode TE arranged at the fourth corner CR4 may be electrically connected to the p-th, first touch line TL1p, and the second touch electrode RE arranged at the fourth corner CR4 may be electrically connected to the first, third touch line RL1.

The p-th, first touch line TL1p may include a first overlapping portion OP1 at least partially overlapping the first touch electrode TE arranged at the fourth corner CR4 in a plan view. Additionally, the first, third touch line RL1 may include a second overlapping portion OP2 at least partially overlapping the second touch electrode RE arranged at the fourth corner CR4 in a plan view.

For example, the p-th, first touch line TL1p may be connected to the first touch electrode TE through a third contact hole CNT3 penetrating an upper insulating layer (e.g., the first touch insulating layer TIL1 of FIG. 6) in the first overlapping portion OP1. Similarly, the first third touch line RL1 may be connected to the second touch electrode RE through a fourth contact hole CNT4 penetrating an upper insulating layer (e.g., the first touch insulating layer TIL1 of FIG. 6) in the second overlapping portion OP2. In an area in which the third contact hole CNT3 is formed, the first overlapping portion OP1 (in which the first touch electrode TE and the p-th first touch line TL1p at least partially overlap in a plan view) may be defined. In an area in which the fourth contact hole CNT4 is formed, the second overlapping portion OP2 (in which the second touch electrode RE and the first third touch line RL1 at least partially overlap in a plan view) may be defined.

The second guard line GL2 may be arranged between the p-th, first touch line TL1p and the first, third touch line RL1. In an embodiment, the second guard line GL2 may also be arranged between the first overlapping portion OP1 and the second overlapping portion OP2. The second guard line GL2 may extend along a profile of the fourth corner CR4 and may have a shape protruding toward the first and second touch electrodes TE and RE between the p-th first touch line TL1p and the first third touch line RL1. That is, the second guard line GL2 may include an extension portion GL21 extending along the profile of the fourth corner CR4 and a protrusion portion GL22 protruding from the extension portion GL21 toward the first and second touch electrodes TE and RE. The protrusion portion GL22 may be arranged between the first overlapping portion OP1 and the second overlapping portion OP2. For example, the protrusion portion GL22 may protrude from one end of the extension portion GL21.

In an embodiment, the second guard line GL2 may be spaced apart from each of the first and second touch electrodes TE and RE. For example, the protrusion portion GL22 of the second guard line GL2 may be spaced apart from the first touch electrode TE by a first distance D1 and may be spaced apart from the second touch electrode RE by a second distance D2. For example, the first distance D1 may be a minimum distance between the protrusion portion GL22 and the first touch electrode TE in a plan view, and the second distance D2 may be a minimum distance between the protrusion portion GL22 and the second touch electrode RE in a plan view.

The first distance D1 and the second distance D2 are not limited, and the first distance D1 and the second distance D2 may be a distance sufficient to minimize a mutual influence of the first and second touch electrodes TE and RE on the second guard line GL2.

In some embodiments, the first dummy pattern electrode DME1 and the second dummy pattern electrode DME2 may be arranged between the p-th first touch line TL1p and the first third touch line RL1. For example, the first dummy pattern electrode DME1 may be arranged between the first overlapping portion OP1 of the p-th first touch line TL1p and the protrusion portion GL22 of the second guard line GL2, and the second dummy pattern electrode DME2 may be arranged between the protrusion portion GL22 of the second guard line GL2 and the second overlapping portion OP2 of the first third touch line RL1. The first dummy pattern electrode DME1 may be arranged between the third contact hole CNT3 and the protrusion portion GL22 in a plan view. The second dummy pattern electrode DME2 may be arranged between the protrusion portion GL22 and the fourth contact hole CNT4 in a plan view. The first dummy pattern electrode DME1, the protrusion portion GL22 of the second guard line GL2, and the second dummy pattern electrode DME2 may be arranged along the profile of the fourth corner CR4.

The first dummy pattern electrode DME1 may at least partially overlap the first touch electrode TE in a plan view, and the second dummy pattern electrode DME2 may at least partially overlap the second touch electrode RE in a plan view. The first and second dummy pattern electrodes DME1 and DME2 may include a metal, an alloy, a conductive metal oxide, a conductive metal nitride, a transparent conductive material, or the like.

In some embodiments, in the peripheral area of the fourth corner CR4 of the sensing area SA (i.e., in an area in which at least one of the first touch lines TL11 to TL1p and at least one of the third touch lines RL1 to RLq are adjacent to each other), the second guard line GL2 and the first and second dummy pattern electrodes DME1 and DME2 are arranged between the first and third touch lines TL11 to TL1p and RL1 to RLq adjacent to each other (e.g., the p-th first touch line TL1p and the first third touch line RL1), so that parasitic capacitance between the first and third touch lines TL11 to TL1p and RL1 to RLq (e.g., the p-th first touch line TL1p and the first third touch line RL1) may be minimized.

In other words, in an embodiment, in an adjacent area of a corner in which at least one of the first touch lines TL11 to TL1p, at least one of the second touch lines TL21 to TL2p, or at least one of the third touch lines RL1 to RLq are adjacent to each other among the corners CR1, CR2, CR3, and CR4, the guard lines GL1, GL2, GL3, and GL4 and the dummy pattern electrodes DME1 and DME2 are arranged between adjacent touch lines, so that parasitic capacitance that may otherwise occur between the touch lines is prevented.

The first and third touch lines TL11 to TL1$p$ and RL1 to RLq, the second guard line GL2, and the first and second dummy pattern electrodes DME1 and DME2 may be arranged in different layers than the first and second touch electrodes TE and RE. For example, the first and second touch electrodes TE and RE may be arranged over the first and third touch lines TL11 to TL1$p$ and RL1 to RLq, the second guard line GL2, and the first and second dummy pattern electrodes DME1 and DME2. For example, the first and third touch lines TL11 to TL1$p$ and RL1 to RLq, the second guard line GL2, and the first and second dummy pattern electrodes DME1 and DME2 may be arranged on the second substrate SUB2 of FIG. 6 (i.e., may be arranged in the same layer as the connection electrodes CNE), and the first and second touch electrodes TE and RE may be arranged on the first touch insulating layer TIL1 of FIG. 6.

The display device 10 according to an aspect of the present disclosure may include the touch panel TP having at least one corner among the corners CR1, CR2, CR3, and CR4 having a non-orthogonal planar shape, such as having a curvature, an acute angle or an obtuse angle. At the corner, at least one of the guard lines GL1, GL2, GL3, and GL4 and the dummy pattern electrodes DME1 and DME2 may be arranged between the touch lines adjacent to each other and connected to different touch electrodes TE and RE. Accordingly, parasitic capacitance between the touch lines may be minimized at the corner.

Figure 8:
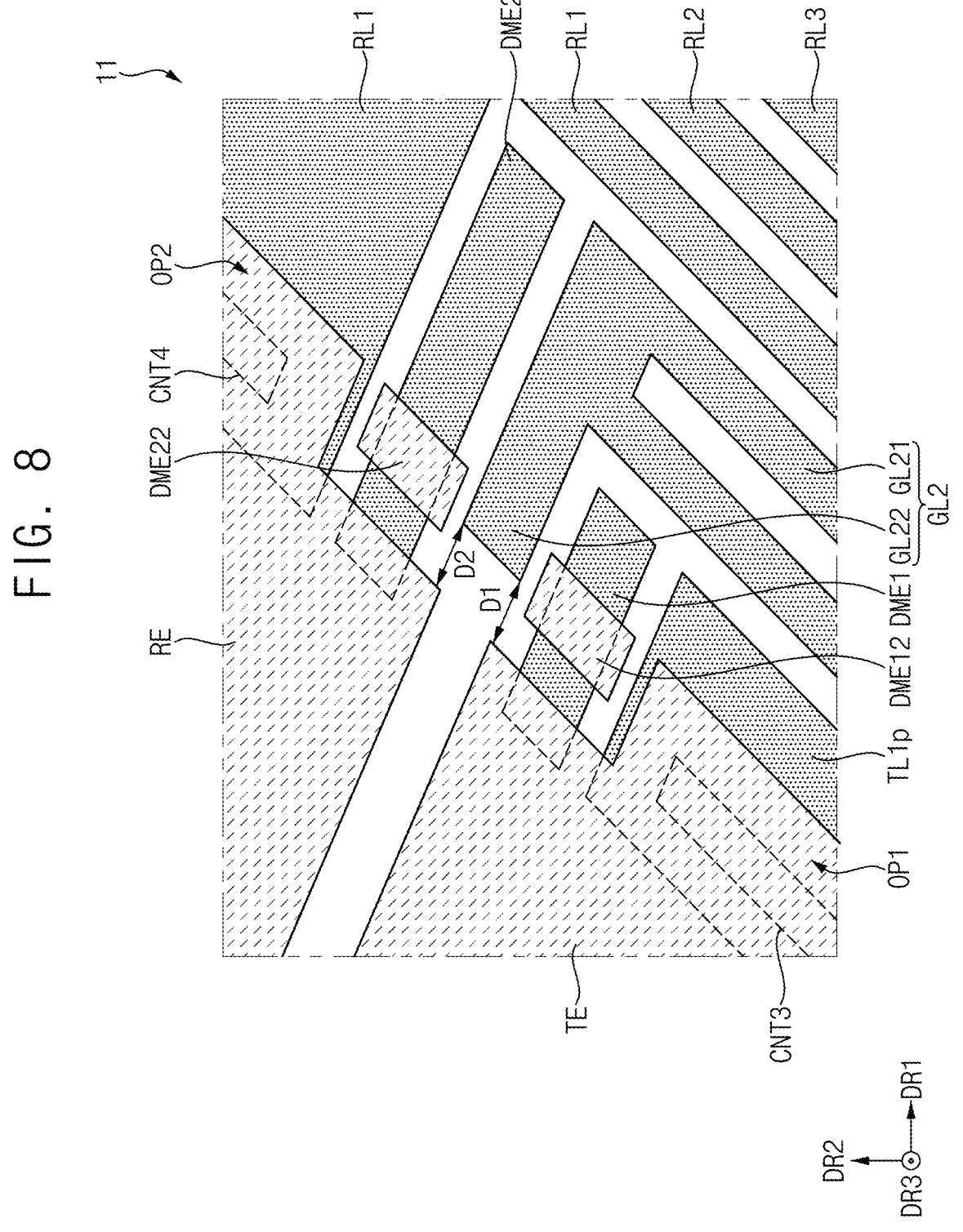
FIG. 8 is a plan view illustrating a display device according to an aspect of the present disclosure.

FIG. 8 is a plan view illustrating a display device according to aspects of the present disclosure. FIG. 8 may correspond to an alternative implementation to the plan view of FIG. 7. That is, FIG. 8 may be a plan view illustrating a portion of a sensing area (e.g., the sensing area SA of FIG. 4) and a portion of a peripheral area (e.g., the peripheral area PA of FIG. 4) of a touch panel (e.g., the touch panel TP of FIG. 4) included in a display device 11. For example, FIG. 8 may be an enlarged plan view of an adjacent (or peripheral) area of at least one of corners of the sensing area (e.g., the fourth corner CR4 of FIG. 4).

The display device 11 described with reference to FIG. 8 may be substantially the same as or similar to the display device 10 described with reference to FIGS. 1, 2, 3, 4, 5, 6, and 7 except for a structure of a dummy pattern electrode. Hereinafter, redundant descriptions will be omitted or simplified.

Referring to FIGS. 4 and 8, at least one of the corners of a sensing area SA (or a touch panel TP) of the display device 11 may have a non-orthogonal planar shape. For example, the corner may have a selected curvature in a plan view or may have an acute angle or an obtuse angle in a plan view.

First and second touch electrodes TE and RE, first and third touch lines TL1$p$, RL1, RL2 and RL3, a guard line GL2, and first and second dummy pattern electrodes DME1 and DME2 may be arranged in the peripheral area of the corner.

The first and second touch electrodes TE and RE arranged at the corner may be spaced apart from each other and may each have an irregular planar shape. The first touch electrode TE may be electrically connected to one of the first touch lines TL11 to TL1$p$ (e.g., a p-th first touch line TL1$p$), and the second touch electrode RE may be electrically connected to one of the third touch lines RL1 to RLq (e.g., a first third touch line RL1).

The p-th, first touch line TL1$p$ may include a first overlapping portion OP1 at least partially overlapping the first touch electrode TE arranged at the corner in a plan view. The first, third touch line RL1 may include a second overlapping portion OP2 at least partially overlapping the second touch electrode RE arranged at the corner in a plan view.

For example, the p-th, first touch line TL1$p$ may be connected to the first touch electrode TE through a third contact hole CNT3 penetrating an upper insulating layer (e.g., the first touch insulating layer TIL1 of FIG. 6) in the first overlapping portion OP1. The first third touch line RL1 may be connected to the second touch electrode RE through a fourth contact hole CNT4 penetrating an upper insulating layer (e.g., the first touch insulating layer TIL1 of FIG. 6) in the second overlapping portion. In an area in which the third contact hole CNT3 is formed, the first overlapping portion OP1 (in which the first touch electrode TE and the p-th first touch line TL1$p$ at least partially overlap) in a plan view may be defined. In an area in which the fourth contact hole CNT4 is formed, the second overlapping portion OP2 (in which the second touch electrode RE and the first third touch line RL1 at least partially overlap) in a plan view may be defined.

The guard line GL2 may be arranged between the p-th first touch line TL1$p$ and the first, third touch line RL1. In some implementations, the guard line GL2 may be arranged between the first overlapping portion OP1 and the second overlapping portion OP2. The guard line GL2 may extend along a profile of the corner and may have a shape protruding toward the first and second touch electrodes TE and RE between the p-th, first touch line TL1$p$ and the first, third touch line RL1. That is, the guard line GL2 may include an extension portion GL21 extending along the profile of the corner, and a protrusion portion GL22 protruding from the extension portion GL21 toward the first and second touch electrodes TE and RE. The protrusion portion GL22 may be arranged between the first overlapping portion OP1 and the second overlapping portion OP2. For example, the protrusion portion GL22 may protrude from one end of the extension portion GL21.

In an embodiment, the guard line GL2 may be spaced apart from each of the first and second touch electrodes TE and RE. For example, the protrusion portion GL22 of the guard line GL2 may be spaced apart from the first touch electrode TE by a first distance D1 and may be spaced apart from the second touch electrode RE by a second distance D2. The first and second distances D1 and D2 are not limited, and the first distance D1 and the second distance D2 may be maintained at a distance sufficient to minimize a mutual influence of the first and second touch electrodes TE and RE on the guard line GL2.

In an embodiment, the first dummy pattern electrode DME1 and the second dummy pattern electrode DME2 may be arranged between the p-th first touch line TL1$p$ and the first third touch line RL1. For example, the first dummy pattern electrode DME1 may be arranged between the first overlapping portion OP1 of the p-th first touch line TL1$p$ and the protrusion portion GL22 of the guard line GL2, and the second dummy pattern electrode DME2 may be arranged between the protrusion portion GL22 of the guard line GL2 and the second overlapping portion OP2 of the first third touch line RL1. The first dummy pattern electrode DME1 may be arranged between the third contact hole CNT3 and the protrusion portion GL22 in a plan view, and the second dummy pattern electrode DME2 may be arranged between the protrusion portion GL22 and the fourth contact hole CNT4 in a plan view. The first dummy pattern electrode DME1, the protrusion portion GL22 of the guard line GL2, and the second dummy pattern electrode DME2 may be arranged along the profile of the corner.

The first dummy pattern electrode DME1 may at least partially overlap the first touch electrode TE in a plan view, and the second dummy pattern electrode DME2 may at least partially overlap the second touch electrode RE in a plan view.

In an embodiment, in an adjacent area of at least one corner in which at least one of the first touch lines TL11 to TL1$p$, at least one of the second touch lines TL21 to TL2$p$, or at least one of the third touch lines RL1 to RLq are adjacent to each other, the guard line (e.g., the guard line GL2) and the dummy pattern electrodes DME1 and DME2 are arranged between adjacent touch lines (e.g., the p-th first touch line TL1$p$ and the first third touch line RL1), so that parasitic capacitance that may occur between the touch lines may be prevented.

In an embodiment, a first sub-dummy pattern electrode DME12 and a second sub-dummy pattern electrode DME22 may be further arranged in the peripheral area of the corner. The first sub-dummy pattern electrode DME12 may at least partially overlap the first dummy pattern electrode DME1 in a plan view, and the second sub-dummy pattern electrode DME22 may at least partially overlap the second dummy pattern electrode DME2 in a plan view. The first sub-dummy pattern electrode DME12 may be arranged between the first overlapping portion OP1 of the p-th first touch line TL1$p$ and the protrusion portion GL22 of the guard line GL2, and the second sub-dummy pattern electrode DME22 may be arranged between the protrusion portion GL22 of the guard line GL2 and the second overlapping portion OP2 of the first third touch line RL1.

The first and second sub-dummy pattern electrodes DME12 and DME22 may be arranged in the same layer as the first and second touch electrodes TE and RE, and may include the same material as the first and second touch electrodes TE and RE. The first and second sub-dummy pattern electrodes DME12 and DME22 may include a metal, an alloy, a conductive metal oxide, a conductive metal nitride, a transparent conductive material, or the like. For example, the first and second sub-dummy pattern electrodes DME12 and DME22 may include a transparent conductive material such as indium tin oxide, but the present disclosure is not limited thereto. Although not shown, in an embodiment, each of the first and second sub-dummy pattern electrodes DME12 and DME22 may extend to the sensing area SA.

In an embodiment, the first and second dummy pattern electrodes DME1 and DME2 and the first and second sub-dummy pattern electrodes DME12 and DME22 at least partially overlap each other in a plan view to form multi-layered dummy pattern electrodes, so that not only parasitic capacitance between the touch lines (e.g., the p-th first touch line TL1$p$ and the first third touch line RL1) but also parasitic capacitance between the touch lines and components arranged in a different layer may be minimized.

Figure 9:
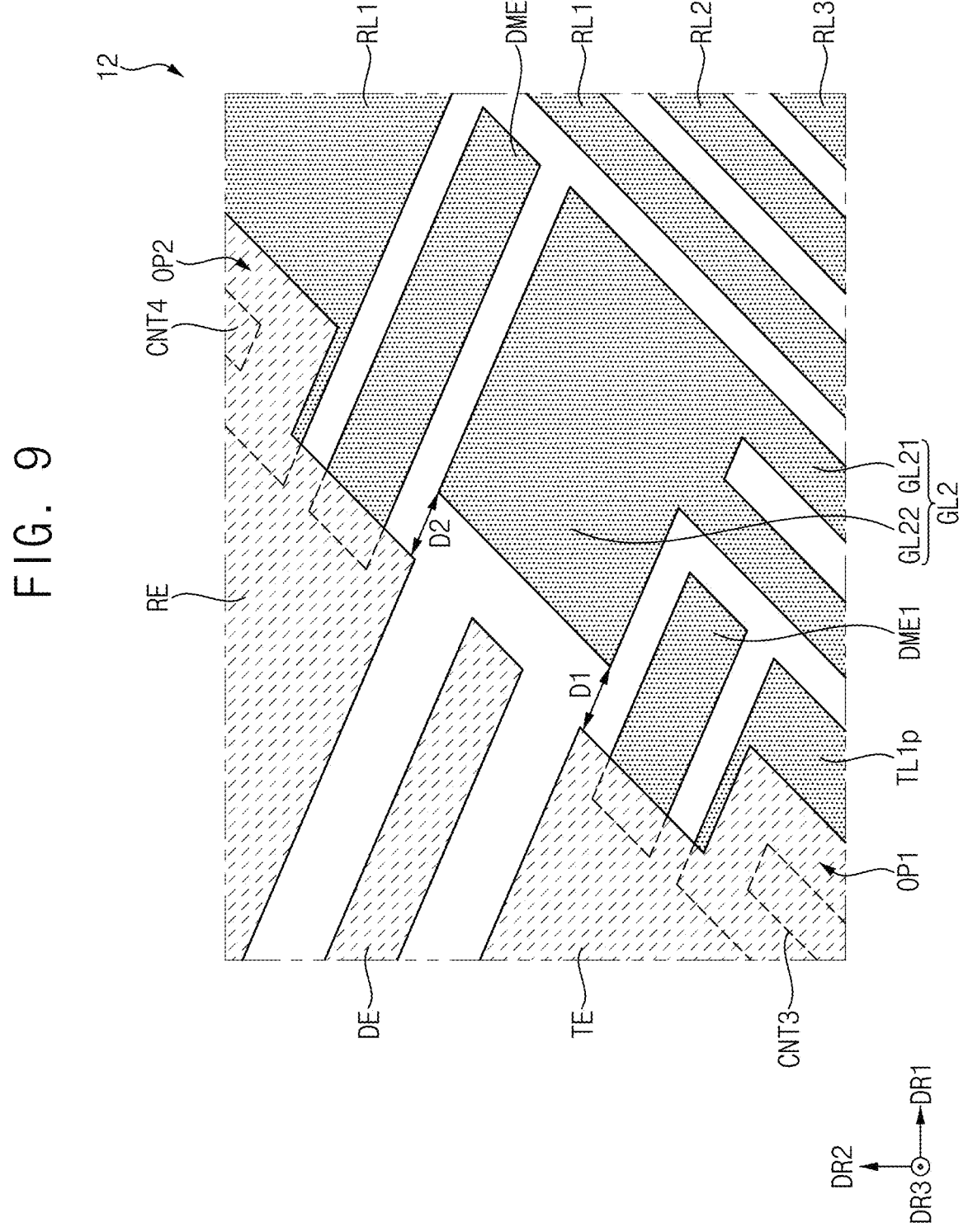
FIG. 9 is a plan view illustrating a display device according to an aspect of the present disclosure.

FIG. 9 is a plan view illustrating a display device according to an embodiment of the present disclosure. FIG. 9 may correspond to an alternative implementation to the plan view of FIG. 7. That is, FIG. 9 may be a plan view illustrating a portion of a sensing area (e.g., the sensing area SA of FIG. 4) and a portion of a peripheral area (e.g., the peripheral area PA of FIG. 4) of a touch panel (e.g., the touch panel TP of FIG. 4) included in a display device 12. For example, FIG. 9 may be an enlarged plan view of an adjacent (or peripheral) area of at least one of corners of the sensing area (e.g., the fourth corner CR4 of FIG. 4).

The display device 12 described with reference to FIG. 9 may be substantially the same as or similar to the display device 10 described with reference to FIGS. 1, 2, 3, 4, 5, 6, and 7 except for an arrangement of a dummy electrode. Hereinafter, redundant descriptions will be omitted or simplified.

Referring to FIGS. 4 and 9, at least one of the corners of a sensing area SA (or a touch panel TP) of the display device 12 may have a non-orthogonal planar shape. For example, the corner may have a selected curvature in a plan view or may have an acute angle or an obtuse angle in a plan view.

First and second touch electrodes TE and RE, a dummy electrode DE, first and third touch lines TL1$p$, RL1, RL2, and RL3, a guard line GL2, and first and second dummy pattern electrodes DME1 and DME2 may be arranged in the peripheral area of the corner.

The first and second touch electrodes TE and RE and the dummy electrode DE arranged at the corner may be spaced apart from each other. The first and second touch electrodes TE and RE arranged at the corner may be spaced apart from each other with the dummy electrode DE interposed therebetween. The first touch electrode TE may be electrically connected to one of the first touch lines TL11 to TL1$p$ (e.g., a p-th first touch line TL1$p$), and the second touch electrode RE may be electrically connected to one of the third touch lines RL1 to RLq (e.g., a first third touch line RL1).

The p-th, first touch line TL1$p$ may include a first overlapping portion OP1 at least partially overlapping the first touch electrode TE arranged at the corner in a plan view. The first, third touch line RL1 may include a second overlapping portion OP2 at least partially overlapping the second touch electrode RE arranged at the corner in a plan view.

For example, the p-th, first touch line TL1$p$ may be connected to the first touch electrode TE through a third contact hole CNT3 penetrating an upper insulating layer (e.g., the first touch insulating layer TIL1 of FIG. 6) in the first overlapping portion OP1, and the first, third touch line RL1 may be connected to the second touch electrode RE through a fourth contact hole CNT4 penetrating an upper insulating layer (e.g., the first touch insulating layer TIL1 of FIG. 6) in the second overlapping portion OP2. In an area in which the third contact hole CNT3 is formed, the first overlapping portion OP1 (in which the first touch electrode TE and the p-th first touch line TL1$p$ at least partially overlap in a plan view) may be defined. In an area in which the fourth contact hole CNT4 is formed, the second overlapping portion OP2 (in which the second touch electrode RE and the first third touch line RL1 at least partially overlap in a plan view) may be defined.

The guard line GL2 may be arranged between the p-th, first touch line TL1$p$ and the first, third touch line RL1. In an embodiment, the guard line GL2 may be arranged between the first overlapping portion OP1 and the second overlapping portion OP2. The guard line GL2 may extend along a profile of the corner and may have a shape protruding toward the first and second touch electrodes TE and RE and the dummy electrode DE between the p-th first touch line TL1$p$ and the first third touch line RL1. That is, the guard line GL2 may include an extension portion GL21 extending along the profile of the corner, and a protrusion portion GL22 protruding from the extension portion GL21 toward the first and second touch electrodes TE and RE and the dummy electrode DE. The protrusion portion GL22 may be arranged between the first overlapping portion OP1 and the second overlapping portion OP2. For example, the protrusion portion GL22 may protrude from one end of the extension portion GL21.

In an embodiment, the guard line GL2 may be spaced apart from each of the first and second touch electrodes TE and RE. For example, the protrusion portion GL22 of the guard line GL2 may be spaced apart from the first touch electrode TE by a first distance D1 and may be spaced apart from the second touch electrode RE by a second distance D2. The first and second distances D1 and D2 are not limited, and the first distance D1 and the second distance D2 may be maintained at a distance sufficient to minimize a mutual influence of the first and second touch electrodes TE and RE on the guard line GL2.

In an embodiment, the first dummy pattern electrode DME1 and the second dummy pattern electrode DME2 may be arranged between the p-th first touch line TL1p and the first third touch line RL1. For example, the first dummy pattern electrode DME1 may be arranged between the first overlapping portion OP1 of the p-th first touch line TL1p and the protrusion portion GL22 of the guard line GL2, and the second dummy pattern electrode DME2 may be arranged between the protrusion portion GL22 of the guard line GL2 and the second overlapping portion OP2 of the first third touch line RL1. The first dummy pattern electrode DME1 may be arranged between the third contact hole CNT3 and the protrusion portion GL22 in a plan view, and the second dummy pattern electrode DME2 may be arranged between the protrusion portion GL22 and the fourth contact hole CNT4 in a plan view. The first dummy pattern electrode DME1, the protrusion portion GL22 of the guard line GL2, and the second dummy pattern electrode DME2 may be arranged along the profile of the corner.

The first dummy pattern electrode DME1 may at least partially overlap the first touch electrode TE in a plan view, and the second dummy pattern electrode DME2 may at least partially overlap the second touch electrode RE in a plan view.

In an embodiment, in an adjacent area of at least one corner in which at least one of the first touch lines TL11 to TL1p, at least one of the second touch lines TL21 to TL2p, or at least one of the third touch lines RL1 to RLq are adjacent to each other, the guard line (e.g., the guard line GL2) and the dummy pattern electrodes DME1 and DME2 are arranged between adjacent touch lines (e.g., the p-th first touch line TL1p and the first third touch line RL1), so that parasitic capacitance that may occur between the touch lines may be prevented.

Figure 10:
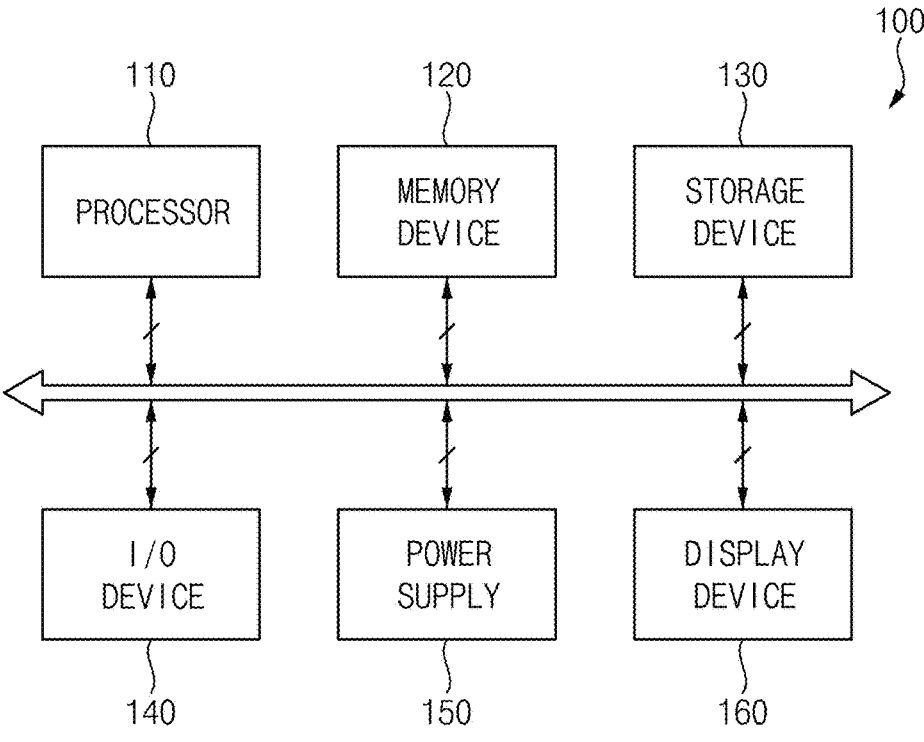
FIG. 10 is a block diagram illustrating an electronic device according to an aspect of the present disclosure.
Figure 11:
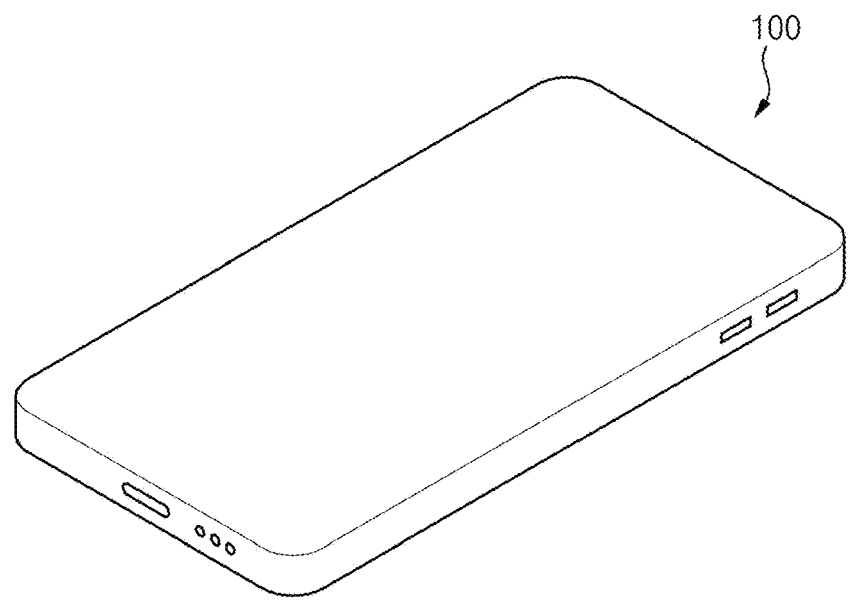
FIG. 11 is a view illustrating an example in which the electronic device of FIG. 10 is implemented as a smartphone according to aspects of the present disclosure.

FIG. 10 is a block diagram illustrating an electronic device according to an embodiment of the present disclosure. FIG. 11 is a view illustrating an example in which the electronic device of FIG. 10 is implemented as a smartphone.

Referring to FIGS. 10 and 11, an electronic device 100 may include one or more processors 110, a memory device 120, a storage device 130, an input/output (I/O) device 140, a power supply 150, and a display device 160. The display device 160 may be the above-described display devices 10, 11, and 12. In addition, the electronic device 100 may further include a plurality of ports for communicating with a video card, a sound card, a memory card, a universal serial bus (USB) device, other systems, or the like.

In an embodiment, as illustrated in FIG. 11, the electronic device 100 may be implemented as the smart phone. However, this is exemplary, and the electronic device 100 is not limited thereto. For example, the electronic device 100 may be implemented as a cellular phone, a video phone, a television, a smart pad, a smart watch, a tablet PC, a vehicle display, a computer monitor, a laptop, a head mounted display (HMD), or the like.

The one or more processors 110 may perform various computing functions individually or collectively. The one or more processors may be configured to control the display device 160. E.g., the one or more processors may send signals to the display device to control that control it's operation. The one or more processors 110 may include a microprocessor, a central processing unit (CPU), an application processor (AP), or the like. The one or more processors may also include any number of co-processors, compute units, compute cores etc. that may work individually or collectively to carry out computer functions. The one or more processors 110 may be coupled to other components through an address bus, a control bus, a data bus, or the like. In an embodiment, the processor 110 may be coupled to an extended bus such as a peripheral component interconnection (PCI) bus.

The memory device 120 may store data for operations of the electronic device 100. For example, the memory device 120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like. Additionally, the memory device may include any non-transitory computer readable medium storing the data for operations the operations.

The storage device 130 may include a solid-state drive (SSD) device, a hard disk drive (HDD) device, a CD-ROM device, or the like.

The I/O device 140 may include an input device such as a keyboard, a keypad, a mouse device, a touch-pad, a touch-screen, and the like, and an output device such as a printer, a speaker, and the like. In an embodiment, the I/O device 140 may include the display device 160.

The power supply 150 may provide power for operations of the electronic device 100. The display device 160 may be connected to other components through buses or other communication links.

The present disclosure can be applied to various display devices and electronic devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

23

24

What is claimed is:

1. A touch panel comprising:
a plurality of first touch electrodes disposed in a sensing area and arranged in a first direction;
a plurality of second touch electrodes disposed in the sensing area and arranged in a second direction intersecting the first direction;
a first touch line connected to a first touch electrode arranged at a corner of the sensing area among the plurality of first touch electrodes and including a first overlapping portion at least partially overlapping the first touch electrode in a plan view;
a second touch line connected to a second touch electrode arranged at the corner of the sensing area among the plurality of second touch electrodes and including a second overlapping portion at least partially overlapping the second touch electrode in the plan view; and
a guard line arranged between the first overlapping portion and the second overlapping portion.

2. The touch panel of claim 1, wherein the guard line includes:
an extension portion extending along a profile of the corner of the sensing area; and
a protrusion portion protruding from the extension portion toward the first touch electrode and the second touch electrode.

3. The touch panel of claim 2, wherein the protrusion portion of the guard line is arranged between the first overlapping portion and the second overlapping portion.

4. The touch panel of claim 1, wherein
the first touch line is connected to the first touch electrode through a first contact hole in the first overlapping portion, and
the second touch line is connected to the second touch electrode through a second contact hole in the second overlapping portion.

5. The touch panel of claim 1, wherein the guard line is spaced apart from each of the first touch electrode and the second touch electrode.

6. The touch panel of claim 2, further comprising:
a first dummy pattern electrode arranged between the guard line and the first touch line; and
a second dummy pattern electrode arranged between the guard line and the second touch line.

7. The touch panel of claim 6, wherein
the first dummy pattern electrode is arranged between the protrusion portion of the guard line and the first overlapping portion of the first touch line, and
the second dummy pattern electrode is arranged between the protrusion portion of the guard line and the second overlapping portion of the second touch line.

8. The touch panel of claim 6, wherein
the first dummy pattern electrode at least partially overlaps the first touch electrode in the plan view, and
the second dummy pattern electrode at least partially overlaps the second touch electrode in the plan view.

9. The touch panel of claim 6, further comprising:
a first sub-dummy pattern electrode arranged on the first dummy pattern electrode and at least partially overlapping the first dummy pattern electrode in the plan view; and
a second sub-dummy pattern electrode arranged on the second dummy pattern electrode and at least partially overlapping the second dummy pattern electrode in the plan view.

10. The touch panel of claim 9, wherein the first sub-dummy pattern electrode and the second sub-dummy pattern electrode are arranged in a same layer as the first touch electrode and the second touch electrode.

11. The touch panel of claim 1, wherein the corner of the sensing area has a non-orthogonal planar shape.

12. The touch panel of claim 1, wherein the corner of the sensing area has a curvature in the plan view.

13. The touch panel of claim 1, further comprising:
a dummy electrode arranged between the plurality of first touch electrodes and the plurality of second touch electrodes.

14. The touch panel of claim 13, wherein the dummy electrode is arranged between the first touch electrode and the second touch electrode at the corner of the sensing area.

15. The touch panel of claim 1, further comprising:
a touch island electrode disposed in the sensing area and arranged between the plurality of first touch electrodes adjacent to each other; and
a connection electrode disposed in the sensing area and connecting the touch island electrode and the plurality of first touch electrodes adjacent to the touch island electrode.

16. A display device comprising:
a display panel including a plurality of pixels disposed in a display area; and
a touch panel arranged on the display panel and including:
a plurality of first touch electrodes disposed in a sensing area corresponding to the display area and arranged in a first direction;
a plurality of second touch electrodes disposed in the sensing area and arranged in a second direction intersecting the first direction;
a first touch line connected to a first touch electrode arranged at a corner of the sensing area among the plurality of first touch electrodes and including a first overlapping portion at least partially overlapping the first touch electrode in a plan view;
a second touch line connected to a second touch electrode arranged at the corner of the sensing area among the plurality of second touch electrodes and including a second overlapping portion at least partially overlapping the second touch electrode in the plan view; and
a guard line arranged between the first overlapping portion and the second overlapping portion.

17. The display device of claim 16, wherein the guard line includes:
an extension portion extending along a profile of the corner of the sensing area; and
a protrusion portion protruding from the extension portion toward the first touch electrode and the second touch electrode and arranged between the first overlapping portion and the second overlapping portion.

18. The display device of claim 17, wherein the touch panel further includes:
a first dummy pattern electrode arranged between the protrusion portion of the guard line and the first overlapping portion of the first touch line; and
a second dummy pattern electrode arranged between the protrusion portion of the guard line and the second overlapping portion of the second touch line.

19. The display device of claim 16, wherein the corner of the sensing area has a non-orthogonal planar shape.

20. An electronic device comprising:
a display device; and
one or more processors configured to control the display device, wherein the display device includes:

a display panel including a plurality of pixels arranged in a display area; and a touch panel arranged on the display panel and including:

a plurality of first touch electrodes disposed in a sensing area corresponding to the display area, and arranged in a first direction;

a plurality of second touch electrodes disposed in the sensing area and arranged in a second direction intersecting the first direction;

a first touch line connected to a first touch electrode arranged at a corner of the sensing area among the plurality of first touch electrodes and including a first overlapping portion at least partially overlapping the first touch electrode in a plan view;

a second touch line connected to a second touch electrode arranged at the corner of the sensing area among the plurality of second touch electrodes and including a second overlapping portion at least partially overlapping the second touch electrode in the plan view; and a guard line arranged between the first overlapping portion and the second overlapping portion.

* * * * *